July 31, 1962 W. R. FRANK 3,047,075
OFFSET DISK HARROWS

Filed Oct. 1, 1958 2 Sheets-Sheet 2

*INVENTOR.*
WILLIAM R. FRANK
BY
ATTORNEYS

United States Patent Office 3,047,075
Patented July 31, 1962

3,047,075
OFFSET DISK HARROWS
William R. Frank, Bell, Calif., assignor to Deere & Company, Moline, Ill., a corporation of Delaware
Filed Oct. 1, 1958, Ser. No. 764,618
11 Claims. (Cl. 172—187)

The present invention relates generally to agricultural implements and more particularly to ground working implements such as disk harrows and the like.

The object and general nature of this invention is the provision of a new and improved disk harrow having front and rear gangs of disks and in which the front disks are smaller and spaced closer together than the rear disks, the rear disks being larger than the front disk and spaced somewhat farther apart. This provides an implement in which the front disks, which usually operate in firm soil, cut through trash, vegetation and the like better than the rear disks which usually operate in soil that is loosened by the front disks. Thus, the front disks reduce the soil and trash to fairly small masses while the larger and more widely spaced apart rear disks turn the soil and mix the soil and vegetation for better decomposition of the latter. This results in improved soil structure and fertility.

Another feature of this invention is the provision of the simple sturdy frame construction for the disk harrow, consisting essentially of two V-shaped frame members, one for each disk gang, set behind the disks where the weight of such parts is more effective in securing added penetration and in addition, relatively simple bearing supports and scraper bars may be provided that serve to prevent clogging in sticky and trashy soils. This is especially advantageous in that the frame arrangement is such that the frame and bearing supports are placed nearer to the resultant forces when the disk gangs are in operation. Also, the bearing supports and cleaner bars fixed in position so as to extend downwardly and forwardly from the associated V-shaped frame member to the disk gang, and the V-shaped frame member is so arranged that while the cleaner bars, for example, being mounted on the rear side, usually remove soil and vegetation before it comes into contact with the frame, if any of such material should pass the cleaner bars, or the bearing supports, it is free to pass on through the disks as the latter rotate, because the forward side of the frame presents only a smooth surface and is so angled with the forward portion of the frame member lies in a divergent position with respect to the paths of movement of the outer or circumferential portions of the disks, thus providing progressively increased forward clearance between the disks and the adjacent portions of the associated frame member.

Still further, another feature of this invention is a provision of a simple weight box attachment that makes use of the V-shaped configuration of the main frame members, the weight box having an open bottom with the ends and sides arranged so that when placed on the V-shaped frame member, the weight box compartment is complete and may receive a sufficient quantity of soil from any field so as to add weight to the implement to assure proper penetration. However, since the bottom of the weight box attachment itself is open, it is an easy matter to remove the soil when weight is no longer needed, simply by tipping the box over and permitting the soil to fall out through the open lower portion. If the soil or other weighting material should remain in the weight box after it is tipped over the same may be readily removed by applying some pressure thereto at the open bottom when the weight box is turned over.

A further feature of this invention is the provision of an angling pivot arrangement between the front and rear gangs that comprises means providing a vertical pivot located rearwardly of the axis of the rear disks but disposed relatively close thereto. This particular arrangement keeps the disk gang at full angle, whether the soil is hard or soft, and thus eliminates any need for a locking latch or other similar mechanism. This arrangement also provides automatic lateral positioning at the front and rear disks as the cutting angle is changed, as by adjusting one disk gang relative to the other about the above mentioned vertical pivot.

These and other objects and advantages of the present invention will be apparent to those skilled in the art after a consideration of the following detailed description, taken in conjunction with the accompanying drawings, in which:

FIG. 5 is an end view of the weight box.

Figure 1:
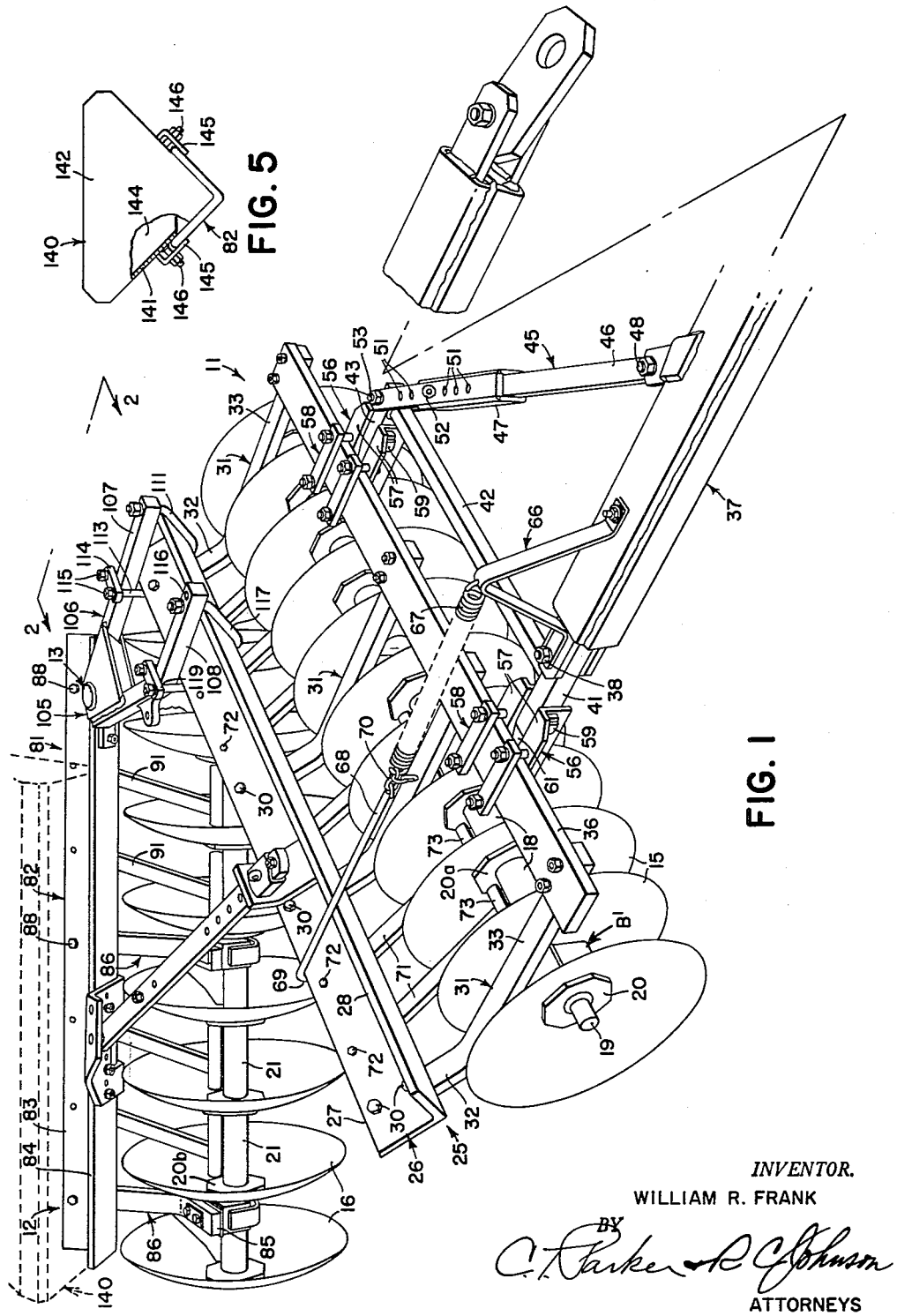
FIG. 1 is a perspective view of an offset disk harrow in which the principles of the present invention have been incorporated.
Figure 2:
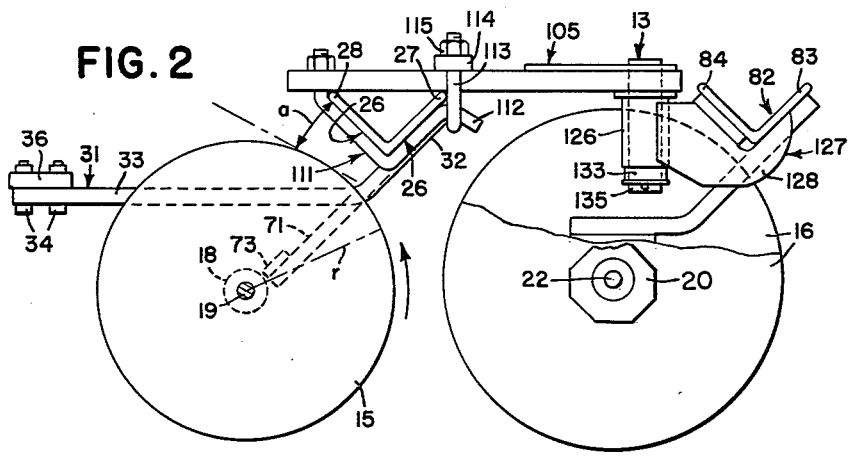
FIG. 2 is an end view, taken generally along the line 2—2 of FIG. 1 but with the harrow gangs in their transport or parallel position.

Referring first to FIG. 1, the disk harrow of the present invention is shown by way of illustration as of the offset type including a front gang 11 and a rear gang 12 hingedly interconnected, as at 13, by angling pivot means, which will be described later. Each gang includes a plurality of disks, the front disks being indicated at 15 and the rear disks at 16. The disks 15 are maintained in the desired axial spacing by spacer sleeves 18, the disks 15 being mounted rigidly on a gang bolt 19 or other suitable means. The rear disks 16 are also maintained in desired axial spacing, as by spacer sleeves 21 that are similar to the spacer sleeves 18 except that the sleeves 21 are longer, so as to dispose the disks 16 a distance apart that is greater than the spacing between the front disks 15. As illustrated in FIG. 1, applicant has found that a spacing ratio of approximately 4 disks in the front gang to 3 disks in the rear gang, where the gangs are of approximately the same length, leaves the surface more level than competitive machines which use wide spacing and one size of disks in all front and rear gangs. Also, the front disks are slightly smaller than the rear disks 16 by a ratio of approximately 7 to 8 as illustrated in FIG. 2 for purposes that will be explained below. The rear disks 16 are also mounted on a gang bolt 22 that passes through the disks and associated sleeves 21, holding the disks rigidly together.

At the concave end of each gang the associated gang bolt carries a relatively large flange 20 welded to the shaft. This provides excellent support for the associated disk that, being disposed at the advancing end of the gang, receives a greater proportion of the stresses imposed on the gangs in operation. The other end of the shaft is threaded and receives a nut 23 that when tightened bears against a reenforcing plate 24 through an intervening washer 24a. Each of the spools 18 and 21 have enlarged end flanges 20a and 20b, preferably welded to the associated spools, and reenforcing plates, similar to those shown at 24, are disposed between the other ends of said spools and the convex sides of the adjacent disks. The reenforcing plates are concave-convex, corresponding to the associated disks.

The frame for the front gang 11 is indicated in its entirety by the reference numeral 25 and includes an extra heavy generally transversely disposed frame member 26 in the form of an angle or V-shaped member arranged so that the flanges 27 and 28 extend divergently upwardly so as to make substantially the same angle with respect to a vertical plane that passes through the apex of the V-shaped member 26, as best shown in FIG. 2. The transverse frame member 26 is interconnected, as by bolts 30, with a plurality of bearing support bars 31, there being three in the form of the invention shown in FIG. 1. Essentially, these bars 31 constitute members that extend downwardly and forwardly in or parallel to the plane of the rear flange 27 of the angle member 26, this portion of the bearing support bar being indicated at 32, the forward portion 33 of each bearing support bar extending horizontally forwardly across the associated front gang bearing B¹ and terminating forwardly of the associated disks 15 to form or connect with hitch-receiving means. It will be seen from FIG. 2 that the plane of the downwardly and forwardly extending support portions 32 would, if extended, pass downwardly in rear of and below the axis of rotation of the disks 15. This provides a trash clearing action which will be explained below. Secured by bolts 34 to the forward ends of the several disk bearing supports 31 is a transverse hitch bar 36 to which a hitch tongue 37 is swingably connected. Preferably, the hitch tongue comprises a relatively heavy box section pivotally connected, as at 38, to a right hand bar 41 that is rigidly interconnected by a transverse bar section 42 to a similar left hand bar 43. A tongue adjusting bar, indicated in its entirety by the reference numeral 45, is connected between the hitch tongue 37 and the left hand bar 43 and comprises two parts 46 and 47. The part 46 is pivoted, as at 48, to the hitch tongue, and the part 47 comprises a square sleeve provided with a plurality of openings 51 any set of which is adapted to receive an adjusting pin 52 that is adapted to be inserted in one of a pair of similar openings formed in the rear end of the part 46. The rear end of the sleeve 47 is pivotally connected to the forward portion of the left hand bar 43, as by a bolt 53.

The bars 41 and 43 are swingably connected with the transverse hitch bar 36 by means of a pair of attaching brackets, each of which is indicated in its entirety by the reference numeral 56. Each attaching bracket comprises a pair of fore-and-aft extending angles 57 fixed by clamping means 58 to the hitch bar 36. The angles 57 are apertured at the forward ends to receive a pivot bolt 59 that pivotally connects the associated bar, 41 or 43, to the associated clamping bracket 56. By virtue of this construction, the hitch tongue 37 and associated parts are adapted to swing vertically relative to the hitch bar 36 and the front gang frame 25 of which the hitch bar 36 forms a part. Downward swinging of the hitch tongue 37 relative to the associated gang frame is limited by virtue of the rear ends of the bars 41 and 43 contacitng the rear portion of the transverse hitch bar 36. Preferably, the rear portions of the bars 41 and 43 are beveled, as indicated at 61, to accommodate the desired amount of downward swinging of the hitch tongue 37 relative to the associated gang frame. The purpose of this arrangement, which constitutes stop means acting between the hitch tongue and associated gang frame, is to prevent upsetting the harrow when backing in loose soil.

For the purpose of securing penetration of the front gangs and, in effect, adding weight, thereto, I provide spring means acting between the hitch tongue and the frame angle 26 that applies the weight of the hitch tongue 37 and associated parts to the front gang. For this purpose I provide a generally V-shaped upwardly extending bracket 66 and bolt the same to the hitch member 37. A spring 67 is connected at its forward end with the bracket 66 and extends rearwardly above the associated hitch bar 36. A rod 68 connects the rear end of the spring 67 to the rear flange 27 of the V-shaped front frame bar 26, the rear end of the rod 68 having a forwardly extending hook portion 69 that engages over the rear flange 27, as best shown in FIG. 1. Any suitable means, such as a plurality of chain links 70, may be provided for adjusting the effective tension exerted by the spring 67. Not only does the spring 67 and associated parts, as just described, add down pressure on the front gang to aid in penetrating hard ground, but also the spring serves to carry the hitch in a raised position, even when disconnected from the tractor. This makes it easy to hitch the front end of the tongue 37 to the tractor when connecting the latter to the harrow. Adjusting the effective length of the hitch bar 45 serves to place the tractor in the best position relative to the harrow to accommodate changes in the cutting angle of the harrow and changes in the field and soil conditions.

A plurality of cleaner bars 71 are bolted, as at 72, to the rear flange 27 of the front angle member 26 and are disposed flat against the rear face of the flange 27, as will best be seen from FIG. 2. The bars 71 are of rectangular section and constitute straight parts that lie substantially in the above-mentioned plane of the rear face of the flange 27, or parallel to said plane. The lower ends of each of the bars 71 carry scrapers 73 that are disposed closely adjacent the associated scraper spools 18. The cleaner bars 71 are mounted on the rear side of the frame angle 26, as shown in FIG. 2, and the bars diverge generally upwardly with respect to an adjacent radius $r$ of the associated disks. Thus, the cleaner bars, together with the associated portions 32 of the bearing supports, are effective in preventing clogging at this point, for the bars 71 and bearing support portions 32 serve to deflect soil and vegetation that might be carried over with the disks during the rotation thereof before such material contacts the V-shaped angle member 26. If any such material does get past the bars 71 and bearing support portions 32, it is then free to pass on through because the forward flange 28 of the frame member 26 lies in a plane that extends forwardly and upwardly in divergent relation with respect to the path of movement of the adjacent edge portions of the disks. This divergence is indicated in FIG. 2 by the angle $a$.

Figure 3:
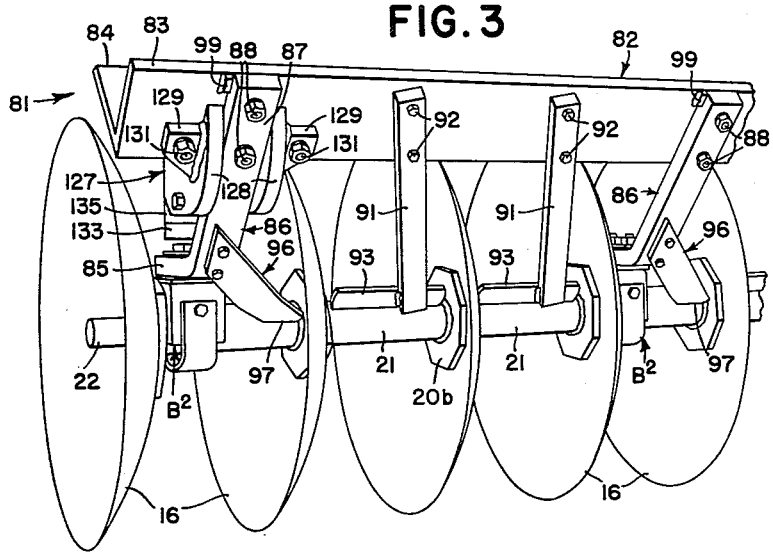
FIG. 3 is a fragmentary perspective view of the rear portion of one of the gang frames, showing the cleaner bars and the associated bearing supports, with associated parts.

The rear gang 12 is of substantially identical construction with the front gang 11, the principal difference being, as mentioned above, that the rear disks are larger and spaced farther apart than the front disks 15. As will be seen from FIG. 3, the rear gang 12 includes a gang frame 81 that is made up of a transverse V-shaped angle member 82 disposed so that the flanges 83 and 84 diverge upwardly and make substantially equal angles with respect to a vertical plane that passes through the apex of the angle member 82. The rear gang 12 includes suitable bearing means B², which may be three in number and identical with the front bearings B¹. Each disk bearing B² is connected to the lower horizontal portion 85 of the associated bearing support member 86 which, like the front bearing support, includes a straight portion 87 that are secured, as by bolts 88, to the forwardly and downwardly facing rear flange 83. Cleaner bars 91 are also bolted to the rear flange 83, as at 92, and these like the front cleaner bars comprise straight members that lie in an upwardly and rearwardly extending plane parallel to or substantially coinciding with the plane of the rear flange 83. Scraper bars 93 are carried on the lower ends of the cleaner bars 91 and are disposed adjacent the associated spools 21. The cleaner bars 91, and also the associated portions of the bearing supports 86, serve to dislodge any soil, trash and the like that might otherwise be carried over by the rotation of the disks. A rear bearing cleaner 96 is bolted to the adjacent portion of the associated bearing support bar 86, as shown in FIG. 3, and includes a bent section 97 that cooperates with the associated spacer spool 21 to dislodge trash and the like. Any such material that for some reason moves past the bars 86 and 91 is readily carried outwardly of the disks by virtue of the fact that the forward flange 84 of the rear V-shaped frame bar 82 lies in divergent relation with respect to the associated disks 16 whereby, as between the disks and the associated rear flange 27, there is progressively increasing clearance in the direction of the rotation of the disks, the angle of clearance being about the same as the angle indicated at *a* in FIG. 2 for the front gang.

In order to sustain axially directed thrusts imposed on the lower portion of the rear disks 16 by soil pressure acting thereagainst, each rear flange 83 carries stop blocks 99 that are mounted on the flange 83 in a position to receive the upper ends of the associated bearing supports 83, as best shown in FIG. 3.

As mentioned above, the front and rear disk gangs are pivotally interconnected for movement into different angular positions about a vertical axis as defined by the pivot 13. The angling pivot mechanism is indicated in its entirety by the reference numeral 105 and comprises a bifurcated member 106 that at the forward portion includes a pair of laterally spaced apart bars 107 and 108. The bar 107 is apertured at its forward end to receive a V-bar 111 that is of special construction. One end is threaded and is extended through the opening in the forward end of the bar 107. The other end of the U-bolt 111 is formed as a hook section 112 (FIG. 2) and a short U-bolt 113 embraces the hook section 112 and receives a clamping bar 114 so that, when the nuts 115 are tightened, the associated V-bar 111 is securely clamped to the associated V-shaped frame member 26. The other bar section 108 is provided with a pair of openings 116 to receive the associated threaded end of a V-bar 117, which may be identical with the V-bar 111 mentioned above. The V-bar 117 is moved to the forward hole 116 (FIG. 1) the compensate for the lateral change of the cutting edges as the disk blades wear to a smaller diameter. The rear portion of the V-bar 117 is connected to the associated bar 108 by a U-bolt and clamp bar means 119 that is similar to the U-bolt 113 and bar 114 described above. By virtue of the means just described, the bifurcated member 105 is rigidly secured to the forward V-shaped frame member 26. Preferably, the parts are so constructed and arranged that the outer U-bolt 113 lies against the adjacent portion of the associated bearing support 32. The horizontal angle at which the member 105 lies relative to the V-shaped frame member 26 may be varied by disposing the front end of the V-bar 117 in the other opening 116, the associated clamp 119 being adjustable along the bar 108.

The vertical pivot pin 13 (FIG. 2) is secured to the end of the pivot mounting part 105 by welding or the like and extends downwardly into a sleeve section 126 that is connected by bracket means 127 to the associated rear gang frame angle member 82. The bracket means 127 comprises a pair of plate-like parts 128 portions of which extend rearwardly underneath the angle 82 and fit against the rear face of the flange 83. Preferably, and as best shown in FIG. 3, these parts 128 are disposed at opposite sides of the associated bearing support portion 87. Lugs 129 on the part 128 are apertured to receive attaching bolts 131. The pin 13 may be adjusted vertically in the sleeve 126 by means of a spacer 133 that may optionally be disposed either below or above the sleeve 126, the parts being held in position by a collar and pin arrangement shown at 135. When the spacer 133 is at the bottom as shown in FIG. 2, the front and rear gangs will cut approximately at the same depth. If it should be desired to have the rear disks cut deeper, this may be secured by removing the spacer 133 from the position shown in FIG. 2 and disposing it between the upper end of the sleeve 126 and the associated pivot supporting member 105.

Figure 4:
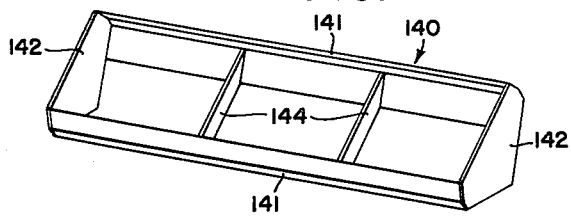
FIG. 4 is a perspective view showing the weight box dismounted from the harrow.

According to this invention, I provide a new and improved weight box for use on the rear frame to serve as a container for adding weight when working hard-to-penetrate soils. According to this invention the weight box, best shown in FIG. 4, is indicated in its entirety by the reference numeral 140 and is in the nature of an open bottom member having side walls 141 and end walls 142. The end walls are generally triangular in configuration and shaped to fit the associated rear angle frame member 82 in snug relation. As best shown in FIG. 1 in dotted lines, the weight box 140 may be mounted on the angle member 82 so as to extend from the rear or outer end of the rear angle member 82 up to a point adjacent the angling pivot connection 105. The side walls 141 conform in angular relationship to the angle between the flanges 83 and 84 of the associated angle member 82, and the lower portions of the side walls 141 overlap the upper edges of the angle member flanges 83 and 84 a relatively small but adequate amount. The side walls 141 are reenforced by cross walls 144 secured to the side walls. The weight box is removably mounted on the angle member 82 by a pair of clips 145 and associated cap screws 146.

By virtue of this construction, when the weight box 140 is in place, the associated angle member serves as the bottom of the weight box, and soil from the field may be shoveled into the weight box to added weight to the rear disk gang. When extra weight is no longer desired, the weight may be eliminated by raising the box 140 sufficient to permit the soil or other weighting material to spill out of the box and over the frame member 82 onto the ground. If such weighting material should become compacted in the box 140, the material may easily be removed by tipping the box over and supplying some pressure to the material through the open bottom of the box.

With further reference to the front and rear gang pivot connection 13 (FIGS. 1 and 2), it will be noted that the pivot lies near the outer disk of the rear gang and adjacent but in rear of the axis of the rear gang as will be seen from FIG. 2. This particular construction results in automatically providing the correct lateral positioning of the rear gang relative to the front gang as the cutting angle of the gangs is changed. For example, when the angle of the disk gang, that is, the angle between the front and rear gangs in working position (FIG. 1), is increased, the disk blades not only cut deeper but also move the soil farther. In conventional offset disk harrows where the pivot is located approximately equidistant between the front and rear gangs, an increase in the cutting angle requires that the pivot be relocated laterally of the harrow so that the rear disks will intercept the soil moved by the front gangs and move the soil back to leave the field in a level condition. In my harrow, the angling pivot is so located that the necessary relocation of the pivot in a lateral position is automatically secured.

The disposition of the pivot axis defined by the pivot member 13 in back of the rear gang axis, as defined by the gang bolt 22 (FIG. 2), serves to prevent partial closing of the harrow when operating under certain soil conditions that produce a very high thrust against the disk gangs. Under such conditions the center of resistance lies somewhat rearward of the gang axis, and by locating the angling pivot also rearward from the gang axis, any tendency for the gangs to close up is eliminated.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. A tandem type disk harrow having front and rear disk gangs, each having a set of axially aligned disks, the front disks, which operate on firm soil being generally circular and having relatively narrow spacing so as to cut through soil and vegetation and reduce the same to small masses, and the rear disks also being generally circular, larger than the front disks and spaced apart farther than the front disks so as to turn the soil and vegetation reduced by the front disks and mix the soil and vegetation for improved decomposition of the vegetation in the soil.

2. A disk harrow comprising a gang of disks adapted to be pulled forward in a generally transverse position relative to the direction of travel, a gang frame comprising an angle member having forward and rear flanges positioned so that the flanges extend divergently upwardly on either side of the vertical plane that passes through center of the angle member, said angle member being located generally rearwardly of the disk gang, bearing means for the ends of said gang, each of said flanges having an inner face and an outer face, and bearing supports fixed to the outer face of the rear flange of said angle member and extending downwardly therefrom to said bearing means, and means connecting said bearing supports to said bearing means.

3. A disk harrow comprising a gang of disks adapted to be pulled forwardly in a generally transverse position relative to the direction of travel, said gang including a plurality of spaced apart disks, spacing spools therebetween, and disk bearing means carried at the end portions of said gang, a gang frame consisting solely of an angle member having forward and rear flanges positioned so that the flanges extend divergently upwardly and located generally rearwardly of the disk gang, each of said flanges having an inner face and an outer face, bearing supports, each comprising a substantially straight bar fixed to the outer face of and extending in a plane parallel to the plane of the rear flange of said angle and extending downwardly therefrom to said bearing means, and cleaner bars also comprising substantially straight bars fixed to the outer face of and extending in a plane parallel to the plane of said rear flange and extending downwardly and forwardly therefrom to points adjacent said spools.

4. A disk harrow comprising a gang of disks adapted to be pulled forwardly in a generally transverse position relative to the direction of travel, a gang frame comprising an angle member having forward and rear flanges positioned so that the flanges extend divergently upwardly and located generally rearwardly of the upper portion of the disk gang, each of said flanges having an inner face and an outer face, cleaner means comprising substantially straight bars fixed rigidly at their upper ends to the outer face of said rear flange and extending downwardly and forwardly therefrom generally parallel to said outer face to points between said disks, the angle of said rear flange being such that the lower portions of said cleaner bars lie in a line that when extended passes downwardly in rear of and below the axis of rotation of the disk gang, whereby said cleaner bars serve to remove soil and vegetation that tend to be carried upwardly by said disks before such material contacts said angle member, the forward flange of the latter extending divergently away from the paths of rotation of the disk edges thereby presenting increased forward clearance with respect to any soil and vegetation that may move past said cleaner bars.

5. A disk harrow comprising a gang of disks adapted to be pulled forwardly in a generally transverse direction, said gang including a plurality of spaced apart disks, spacing spools therebetween, and disk bearing means carried at the end portions of said gang, a gang frame comprising an angle member having forward and rear flanges positioned so that the flanges extend divergently upwardly and are located generally rearwardly of the gang, each of said flanges having an inner face and an outer face, bearing supports fixed to the outer face of the rear flange of said angle and extending downwardly therefrom in the general plane of said rear flange and then forwardly in a horizontal direction, means connecting said bearing means to the horizontal portions of said bearing supports, said horizontal portions of the bearing supports extending forwardly beyond the associated bearing means and the associated disks, and hitch means connected to the forward portions of said bearing supports.

6. A disk harrow comprising a gang of disks adapted to be pulled forwardly in a generally transverse position relative to the direction of travel, said gang including a plurality of spaced apart disks, spacing spools therebetween, and disk bearing means carried at the end portions of said gang, a gang frame comprising an angle member having forward and rear flanges positioned so that the flanges extend divergently upwardly and are located generally rearwardly of the gang, each of said flanges having an inner face and an outer face, bearing supports fixed to the outer face of the rear flange of said angle and extending downwardly therefrom in the general plane of said rear flange and then forwardly in a horizontal direction to points forward of the associated disks, a transverse tie bar fixed to the forward portions of said bearing supports, hitch means pivoted to said tie bar adjacent the forward portion thereof, and means rigid with said hitch means and extending rearwardly underneath the tie bar to prevent upsetting the harrow when backing the latter.

7. A disk harrow comprising a front gang and a rear gang, said front gang comprising a plurality of interconnected axially aligned front disks and a front gang frame, said rear gang comprising a plurality of interconnected axially aligned rear disks and a rear gang frame, and pivot means interconnecting said gang frames, said pivot means including a part rigidly fixed to the front gang frame and extending rearwardly therefrom to a point over the rear disks, a generally vertical pivot member carried by the rear end portion of said part, and means on the rear gang frame receiving said pivot member and disposing the latter in rear of the axis of said rear disks and adjacent one end of said interconnected axially aligned rear disks.

8. The invention set forth in claim 3, further characterized by a generally horizontal transversely extending scraper bar fixed to the lower end of each cleaner bar and extending generally parallel to and in close proximity to the associated spacing spool.

9. A disk harrow comprising a front gang and a rear gang, said front gang comprising a plurality of interconnected axially aligned front disks and a front gang frame, said rear gang comprising a plurality of interconnected axially rear disks and a rear gang frame, and pivot means interconnecting said gang frames, said pivot means including a part adapted to be adjustably fixed to the front gang frame and extending rearwardly therefrom and a pivot member carried by the rear portion of said part and swingably connected with the rear gang, and means connecting the forward portion of said part with said front gang for holding said part in fixed positions of angular adjustment in a horizontal plane so as to dispose said pivot member in different positions laterally of the harrow.

10. A disk harrow comprising a front gang and a rear gang, said front gang comprising a plurality of interconnected axially aligned front disks and a front gang frame, said rear gang comprising a plurality of interconnected axially aligned rear disks and a rear gang frame, and pivot means interconnecting said gang frame, said pivot means including a part and means connecting the forward portion of said part to the front gang in fixed positions of angular adjustment in a horizontal plane, said part extending rearwardly therefrom to a point over the rear disks, a generally vertical pivot member carried by the rear end portion of said part, and means on the rear gang frame receiving said pivot member and disposing the latter in rear of the axis of said rear disks and adjacent one end of said interconnected axially aligned rear disks, whereby adjustment of said part laterally in said horizontal plane relative to the front frame serves to dispose said pivot member in different positions laterally of the harrow.

11. A tandem type disk harrow comprising a front gang and a rear gang of approximately the same length as the front gang, said front gang comprising a plurality of interconnected axially aligned generally circular front disks and a front gang frame, said rear gang comprising a plurality of interconnected axially aligned generally circular rear disks and a rear gang frame, the front disks being slightly smaller in diameter than the rear disks in a ratio of approximately seven to eight and the front disks being spaced more closely together than the rear disks in such a ratio that there are approximately four disks in the front gang for every three disks in the rear gang whereby the smaller more closely spaced front disks reduce the soil and trash to fairly small masses and the larger and more widely spaced apart rear disks operate at substantially the same depth as the front disks and turn and mix the soil and vegetation for better decomposition of the latter.

References Cited in the file of this patent

UNITED STATES PATENTS

| | | |
|---|---|---|
| 455,709 | Freiburghouse | July 7, 1891 |
| 487,622 | Hill | Dec. 6, 1892 |
| 928,088 | Voelkel | July 13, 1909 |
| 1,059,141 | Gerhard | Apr. 15, 1913 |
| 1,775,269 | Barker | Sept. 9, 1930 |
| 1,827,125 | Towner | Oct. 13, 1931 |
| 1,998,501 | Gemberling | Apr. 23, 1935 |
| 2,204,684 | Le Bleu | June 18, 1940 |
| 2,404,252 | Rutter | July 16, 1946 |
| 2,607,177 | Rose | Aug. 19, 1952 |
| 2,685,159 | Brundage | Aug. 3, 1954 |
| 2,784,657 | Newkirk | Mar. 12, 1957 |
| 2,970,657 | Toland | Feb. 7, 1961 |